United States Patent [19]

Yamaguchi et al.

[11] 4,208,216

[45] Jun. 17, 1980

[54] GROUTING MATERIALS FOR CONSOLIDATION OF SOILS

[75] Inventors: Hachiro Yamaguchi, Hiroshima; Tatsuhiko Noguchi; Kiichi Endō, both of Iwaki, all of Japan

[73] Assignee: Kureha Kagaku Kogyo Kabushiki Kaisha, Tokyo, Japan

[21] Appl. No.: 902,974

[22] Filed: May 3, 1978

[30] Foreign Application Priority Data

May 9, 1977 [JP] Japan .................................. 52-52097
May 9, 1977 [JP] Japan .................................. 52-52098

[51] Int. Cl.$^2$ .............................................. C09D 1/02
[52] U.S. Cl. ........................................ 106/74; 106/84; 106/900
[58] Field of Search ................ 106/38.3, 38.35, 74, 106/84, 900, 76; 423/235; 405/263, 266

[56] References Cited

U.S. PATENT DOCUMENTS

| | | | |
|---|---|---|---|
| 3,138,471 | 6/1964 | Wygant | 106/84 |
| 3,146,829 | 9/1964 | Mann | 106/84 |
| 3,335,018 | 8/1967 | Peeler | 106/74 |
| 3,991,161 | 11/1976 | Saitoh et al. | 423/235 |
| 3,992,508 | 11/1976 | Saitoh et al. | 423/235 |
| 4,055,623 | 10/1977 | Saitoh et al. | 423/235 |

*Primary Examiner*—James Poer
*Attorney, Agent, or Firm*—Stevens, Davis, Miller & Mosher

[57] ABSTRACT

A composition including a silicate, imidodisulfonic acids and/or the salts thereof is disclosed. This composition is useful as grouting agent.

6 Claims, No Drawings

GROUTING MATERIALS FOR CONSOLIDATION OF SOILS

FIELD OF THE INVENTION

This invention relates to grouting materials for use in the consolidation of soils such as for the construction of tunnels, dams and the other underground structures.

BACKGROUND OF THE INVENTION

In the treatment of ground for its consolidation, there have heretofore been employed various methods. Examples of such methods include a method using cement milk and a method using sodium silicate and a hardening agent which hardens the sodium silicate. As the hardening agent, there is used, for example, at least one material selected from the group consisting of calcium chloride, sodium carbonate, sodium sulfate, sulfuric acid, copper sulfate, slaked lime, aluminum sulfate, construction-grade cement, bentonite, sodium aluminate, sodium bicarbonate, and sodium silicofluoride. In the method using sodium silicate and a hardening agent, however, the time (gelation time) in which the ground is consolidated is generally short and is extremely variable with a small change of blending ratio of sodium silicate with the hardening agent and therefore, since the gelation time can not be controlled sufficiently, the consolidation of ground by this method has been difficult.

In recent years, there have been developed various organic grouting agents of the type which have high ground-permeating capacities and by which gelation times are easily adjusted. Such organic grouting agents include those made of polyacrylamides, urea resins, polyacrylates, urethane resins and chromium lignin, for example. Use of these organic grouting agents has been banned in Japan since 1975 for fear that they may be toxic to human beings. This is because the organic grouting agents, when used in areas located near wells, underground water strata, rivers and brooks, lakes and swamps, or seas, may possibly effect humans, fishes and shell-fishes, etc. In Japan, the Ministry of Construction published "Provisional Guide Concerning Execution of Construction Works by Chemicals' Injection Process" in July, 1974. In this ministerial order, it is stipulated that "the chemicals acceptable for use in construction works shall be limited, for the time being, to water glass type liquid chemicals (liquid chemicals composed predominantly of sodium silicate) free from violently active compounds or fluorine compounds." Since then, only water glass type liquid chemicals have been used for the purpose.

Of the various methods available for works involving the use of these water glass type liquid chemicals, that which has gained widespread acceptance for actual use is the so-called LW process (Japanese Patent Publication No. 24122/1961) which makes use of a suspension type of water glass grouting agent composed of construction-grade cement and sodium silicate. To be specific, this grouting agent includes from 2.5 to 100 parts by weight of the principal component of water glass per part by weight of construction-grade cement. This LW process, however, has a disadvantage that the gelation time and the strength of treated soil are in a mutually contradicting relationship. As the ratio of cement is increased for the purpose of increasing the strength, the gelation time is shortened proportionally. In other words, the agent hardens itself before it penetrates to the desired depth in the soil, preventing smooth injection.

SUMMARY OF THE INVENTION

Therefore the present invention aims to provide a grouting material which has a very low toxicity to the human body and is capable of exhibiting a desired gelation time in actual use.

This and the other objects of the present invention will become apparent from the description to be given herein below.

As the result of a study in search of a grouting agent ideal for the purpose mentioned above, it has been discovered that a composition including a silicate, imidodisulfonic acid and/or a salt thereof is quite suitable as a grouting agent.

According to this invention, therefore, there is provided a grouting agent composition which includes (1) a silicate and (2) at least one compound selected from the group consisting of imidodisulfonic acid and the imidodisulfonates.

DETAILED DESCRIPTION OF THE INVENTION

The silicate used in the present invention may be of any type insofar as it has an ability to harden soil. Alkali metal salts of silicic acid are good examples. A specific example of these alkali metal salts of silicic acid is water glass. The water glass may be any of the grades available. Where the compound selected from the group consisting of imidodisulfonic acid and the imidodisulfonates has a fairly high degree of acidity, it is preferable to use water glass of the type which has a low silicon dioxide/sodium oxide ($SiO_2/Na_2O$) ratio, namely, having a high $Na_2O$ content, for the purpose of obtaining a desired gelation time. Conversely where the compound selected from among the imidodisulfonates has a low degree of acidity, it is preferable to use water glass of the type which has a high $SiO_2/Na_2O$ ratio.

Imidodisulfonic acid [$(SO_3H)_2NH$] and its salts which are used in the present invention are obtained for example when a nitrogen oxides-containing exhaust gas is brought into contact with an aqueous solution containing at least one ferrous salt and at least one alkali sulfite to remove the nitrogen oxides from the exhaust gas (as disclosed in U.S. Pat. No. 3,991,161, U.S. Pat. No. 3,992,508 and U.S. Pat. No. 4,055,623). The imidodisulfonates used in the present invention may be in various forms including ammonium salts, sodium salts, potassium salts, calcium salts, and magnesium salts. Some specific examples are as follows:

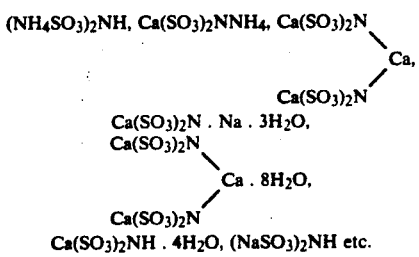

Imidodisulfonic acid and its salts have various degrees of acidity in the range of from 4 to 11 and various degrees of solubility in water. Where imidodisulfonic acid and the salts thereof are used in the present invention for consolidating the soil, the variation of gelation time which occurs with the changes of their blending ratios is relatively small and the gelation time can be easily controlled, moreover, the treated soil has a high strength. Imidodisulfonic acid and its salts have very low toxicity, so that, when used as builders for synthetic detergents, they are said to contribute less to environmental pollution than the sodium tripolyphosphate. This fact serves as proof that they are safe for the purpose contemplated herein.

The grouting material of this invention includes a silicate of the foregoing description and at least one compound selected from the group consisting of imidodisulfonic acid and its salts. In this case, the blending ratio of the components is not particularly critical but may be suitably selected in accordance with the nature of the soil subjected to consolidation. To be specific, by suitably selecting a silicate and imidodisulfonic acid or one of its salts, mixing these components in a desired ratio, and injecting the resultant mixture into the soil, the ground can be consolidated at a desired gelation rate (hardening rate) and therefore, the work for consolidating the soil is easily carried out. This procedure, moreover, will preclude possible leakage of the alkaline component from the ground after the consolidation and enable the ground to manifest sufficient strength and water shielding property.

The grouting material of this invention can contain a hardening agent which hardens the silicate, in addition to the silicate and the imidodisulfonic acid or salt. Examples of the hardening agents include calcium chloride, sodium carbonate, sulfuric acid, copper sulfate, slaked lime, construction-grade cement, bentonite, sodium aluminate, sodium bicarbonate, sodium silicofluoride, calcium aluminate, gypsum, sodium sulfate, sodium bisulfite, calcium carbonate, cellulose glycolate, ammonium sulfate, phosphoric acid, sodium phosphate, ethylene carbonate, potassium bicarbonate, adipic acid, dimethyl sulfoxide, ethyleneglycol diacetate, glyoxal, gamma butyllactone, acetic acid, fatty acid esters of polyethyleneglycol, etc. Although Portland cement, mixed cement or any other similar cement can be used as the construction-grade cement, it is preferable to use Portland cement because this particular cement is easily available. In this case, the blending ratio of the silicate to the cement may be sufficient in the approximate range of from 0.1 to 100 parts by weight of the silicate per part by weight of the cement. Where the blending ratio of cement to the silicate is large, the hardening time (gelation time) is very short although the resultant consolidated ground has a high strength, the composition in this case can not be easily used. For the purpose of increasing the strength of the resultant consolidated soil and suitably controlling the gelation time, it is preferable to mix the silicate with the cement in the ratio of from 0.2 to 2 parts by weight of the silicate per part by weight of the cement and to blend into the resultant mixture sodium imidodisulfonate or another similar imidodisulfonate having a relatively high pH value in an amount of from 0.1 to 10 parts by weight per part by weight of the solid sodium silicate contained in the mixture. For the purpose of properly shortening the hardening time, it is preferable to select, from among the imidodisulfonates, one which has a high calcium content (for example, calcium imidodisulfonate).

In case where the particular purpose of the consolidation of ground requires an adjustment in the hardening capacity of the composition of the present invention, such an adjustment may be carried out, of course, by adjusting the concentrations of silicate, imidodisulfonic acid and/or salt thereof. When necessary, the adjustment may be carried out by additionally adding to the composition at least one member selected from the group consisting of calcium chloride, sodium carbonate, sulfuric acid, copper sulfate, slaked lime, cement bentonite, sodium aluminate, sodium bicarbonate, sodium silicofluoride, calcium aluminate, gypsum, sodium sulfate, sodium bisulfite, calcium carbonate, cellulose, glycolic acid, ammonium sulfate, phosphoric acid, sodium phosphate, ethylene carbonate, potassium bicarbonate, adipic acid dimethyl sulfoxide, ethylene glycol diacetate, glyoxal, gamma butyllactone, acetic acid, fatty acid esters of polyethyleneglycol, etc.

The consolidation of ground by use of the composition of this invention can be carried out by a method heretofore practised in the art. For example, spraying, incorporation, injection or any other method can be selected to suit the purpose. All the components of the composition may be mixed prior to the injection and then injected under pressure by a pump. Alternatively, the components may be injected independently of each other. Injection of the composition into the ground may also be carried out by mixing the compartments in their powdered state, placing the resultant mixture in, for example, a paper cylinder, inserting the cylinder into a hole drilled in advance in the ground and allowing the mixture to be hardened in the soil.

Since the composition of this invention is inorganic in nature, there is no possibility of the composition violating the COD (chemical oxygen demand) standards for water quality and waste water disposal. Thus, the use of this composition proves quite advantageous.

Now, the present invention will be described more specifically with reference to working examples, which are solely illustrative of and not limitative in any respect of the present invention.

EXAMPLE 1

A glass tube 5 cm in inside diameter and 10 cm in height was packed with about 400 g of standard sand, with a space left on top of the resultant sand bed. Into this space, an aqueous mixed composition (the water glass as the first component and the imidodisulfonate as the second component) was thoroughly stirred and poured. Quickly, a reduced pressure was applied at the bottom of the tube to cause the liquid composition penetrate into the sand. After the contents in the tube had gelled, a portion of the sand bed penetrated by the composition was tested for hardness determined in terms of compression strength. The results are shown in Table 1 below. In all the test runs involved, the values of hardness found of the consolidated sand samples reached the range of from 5 to 20 kg/cm$^2$ after 48 hours.

Table 1 (1)

| Test Run No. | Water glass (first component) Hardening agent (second component) | 1 | 2 | 3 | 4 | 5* | 6 |
|---|---|---|---|---|---|---|---|
| First compo- | Sodium silicate (g) | 50 | 70 | 50 | 70 | 70 | 70 |

Table 1 (1)-continued

| | | | | | | | |
|---|---|---|---|---|---|---|---|
| nent | Water (g) | 50 | 30 | 50 | 30 | 30 | 30 |
| Second compo-nent | Water (g) | 80 | 80 | 80 | 80 | 80 | 80 |
| | Imidodisulfonate | $Ca(SO_3)_2NH \cdot 3H_2O$ | | $Ca(SO_3)_2NNH_4$ | | $Ca(SO_3)_2N\diagdown_{Ca \cdot 8H_2O}\diagup Ca(SO_3)_2N$ | $(NaSO_3)_2NNa \cdot 3H_2O$ |
| | (g) | | 20 | | 20 | 20 | 20 |
| Hardening (gelation) time (min.) | | | | | | | |
| Compression strength of penetrated portion of sand bed (kg/cm$^2$), after 2 hours | | 2.0 | 3.5 | 3.0 | 4.0 | 2.5 | |
| Compression strength of penetrated portion of sand bed (kg/cm$^2$), after 48 hours | | 6.0 | 14.0 | 10.0 | 15.0 | 18.0 | 8.0 |

Notes: *, **: In the test runs, the sand samples tended to undergo partial coagulating, indicating that the method of the mixing of two component liquids should be properly adjusted.

Table 1 (2)

| Test Run No. | Water glass (first component) Hardening agent (second component) | Comparative example 1 | Comparative example 2 | Comparative** example 3 | Comparative** example 4 |
|---|---|---|---|---|---|
| First component | Sodium silicate (g) | 50 | 70 | 50 | 70 |
| | Water (g) | 50 | 30 | 50 | 30 |
| Second component | Water (g) | 90 | 80 | 90 | 90 |
| | | Sodium aluminate | | Calcium chloride | |
| | Hardening component (g) | 10 | 20 | 10 | 10 |
| Gelation (gelling) time (min.) | | 5 | 3 | 1 | 0.5 |
| Compression strength of penetrated portion of sand bed (kg/cm$^2$), after 2 hours | | 3.0 | 3.5 | 4.0 | 4.0 |
| Compression strength of penetrated Portion of sand bed (kg/cm$^2$), after 48 hours | | 3.5 | 3.8 | 4.2 | 4.3 |

Notes: *, **: In the test runs, the sand samples tended to undergo partial coagulating, indicating that the method of the mixing of two component liquids should be properly adjusted.

EXAMPLE 2

The relationship between the gelation time and the blending ratio in use of the sodium silicate and the various imidodisulfonates is shown in Table 2 (1) below.

Nos. 1-3 show the relationship between the adding amount of $Ca(SO_3)_2NH \cdot 3H_2O$ and the gelation time, illustrating that the gelation time was not largely varied with a small change of the amount of a component. Nos. 4-6 show that the gelation time was reduced when $Ca(SO_3)_2NNa \cdot 3H_2O$ was added to $Ca(SO_3)_2NH \cdot 3H_2O$. Thus, the gelation time can be adjusted by suitably selecting the kind and combination of imidodisulfonates.

For comparison, the results for a test using sodium aluminate and calcium chloride are shown in Table 2(2) below. As apparent from the table, the gelation time varied greatly with a small change in the amount of a component added and a severe adjustment of blending ratio was necessary.

Table 2(1)

| No. | | | (at 15° C.) | | | | |
|---|---|---|---|---|---|---|---|
| | | | 1 | 2 | 3 | 4 | 5 | 6 |
| Sodium silicate ($Na_2O/SiO_2$ of approximately 1:3) | (JIS No. 3) (g) | 50 | 50 | 50 | 50 | 50 | 50 |
| Water | (g) | 50 | 50 | 50 | 50 | 50 | 50 |
| $Ca(SO_3)_2NH \cdot 3H_2O$ | (g) | 18 | 20 | 22 | 20 | 20 | 15 |
| $Ca(SO_3)_2NNa \cdot 3H_2O$ | (g) | 0 | 0 | 0 | 3 | 6 | 6 |
| Water | (g) | 80 | 80 | 80 | 80 | 80 | 80 |
| gelatin time | (min) | 4.5 | 3 | 2.3 | 5 | 9 | 25 |

Table 2(2)

| No. | | (at 15° C.) | | | | | |
|---|---|---|---|---|---|---|---|
| | | 7 | 8 | 9 | 10 | 11 | 12 |
| Sodium silicate ($Na_2O/SiO_2$ of approximately 1:3) | (JIS No. 3) (g) | 50 | 50 | 50 | 50 | 50 | 50 |
| Water | (g) | 50 | 50 | 50 | 50 | 50 | 50 |
| | | Sodium alminate | | | calcium chloride | | |
| Hardening component | (g) | 8 | 10 | 12 | 8 | 10 | 12 |
| Gelation time | (min) | 13 | 5 | 1.5 | 4 | 1 | immediately |

Table 2(2)-continued

| No. | 7 | 8 | 9 | 10 | 11 | 12 (at 15° C.) |
|---|---|---|---|---|---|---|
|  |  |  |  |  |  | crystallized |

EXAMPLE 3

An aqueous mixture containing 30 g of Portland cement dispersed in 100 g of water was mixed with an aqueous solution of 70 g of water glass ($Na_2O/SiO_2$ = approximately 1:3) and 10 g of trisodium imidodisulfonate, $(NaSO_3)_2NNa$, dissolved in 50 g of water. The gellation occurred about after 10 min of mixing, the strength of the gel itself being 1.5 kg/cm² after 72 hr of aging. The strength of the specimen prepared by mixing the above-mentioned mixture and the standard sand of Toyoura was 25 kg/cm² after aging the mixture for 72 hr in a moist air.

A comparison specimen prepared as above, however, without adding sodium imidodisulfonate, gelled soon after the admixture, and so it could not be used for consolidating the sand.

EXAMPLE 4

In the treatment of Example 3, the gelation time could be elongated by about 15 minutes when the amount of $Na(SO_3)_2NNa$ was increased to 20 g. The strength of the gel itself was 1.3 kg/cm² after 24 hours of standing and 8 kg/cm² after 72 hours of curing. A specimen prepared by mixing the mixtue with Toyoura standard sand, coagulating the resultant admixture and curing the coagulated admixture in moisture for 72 hours, had a strength of 22 kg/cm².

EXAMPLE 5

40 g of Portland cement dispersed in 100 g of water was mixed with a liquid containing 200 g of water glass as used in Example 3 and 20 g of $Ca(SO_3)_2NNa.3H_2O$ dissolved in 100 g of water. The resultant mixture gelled after about two minutes. When the addition of imidodisulfonate was omitted, the gelation time was 10 minutes. This fact showed that the gelation time could be adjusted by controlling the the amount of imidodisulfonate added.

EXAMPLE 6

The relationship between the hardening time and the blending ratio of cement, water glass and imidodisulfonates is shown in Table 3 below.

Generally, as the ratio of water to the cement was increased, the hardening time was proportionally reduced. In contrast, the hardening time could be adjusted over a large range by using, for example, $(NaSO_3)_2NNa$ or $Ca(SO_3)_2NNa.3H_2O$.

Table 3

| Portland cement g | $H_2O$ g | Water glass ($Na_2O/SiO_2$ of approximately 1:3) g | $(NaSO_3)_2NNa$ g | $H_2O$ g | weight ratio of cement/water glass — | hardening time min. (15° C.) |
|---|---|---|---|---|---|---|
| 40 | 100 | 30 | 0 | 150 | 1.3 | 0.1 |
| 40 | 100 | 30 | 20 | 150 | 1.3 | 1.8 |
| 30 | 100 | 70 | 0 | 50 | 0.4 | 2.0 |
| 30 | 100 | 70 | 10 | 50 | 0.4 | 10 |
| 30 | 100 | 70 | 20 | 50 | 0.4 | 15 |
| 40 | 100 | 200 | 0 | 100 | 0.2 | 10 |
| 40 | 100 | 200 | 20* | 100 | 0.2 | 2 |

*$Ca(SO_3)_2NNa . 3H_2O$

What is claimed is:

1. A grouting composition comprising an alkali metal silicate and a member selected from an imidosulphonic acid and an imidosulphonate.

2. A grouting composition comprising:
   (a) an alkali metal silicate;
   (b) a member selected from an imidosulphonic acid and an imidosulphonate; and
   (c) an aqueous cement.

3. The composition according to claim 1, wherein said alkali metal silicate is water glass.

4. The composition according to claim 1, wherein said imidodisulfonate is an ammonium salt, sodium salt, potassium salt, calcium salt or magnesium salt.

5. Earth having increased resistance to being deformed, said earth having been treated with the grouting composition of claim 1 or 2.

6. A method of grouting earth which comprises dispersing in earth the grouting composition of claim 1 or 2.